United States Patent [19]

Platt et al.

[11] 4,001,887

[45] Jan. 4, 1977

[54] MANUAL TAPE APPARATUS WITH GENERATOR FOR PROVIDING ELECTRICAL POWER

[75] Inventors: Stephen A. Platt; Gerhard W. Wolff, both of Grand Haven, Mich.

[73] Assignees: Stephen A. Platt; Vernet B. Platt; Gerhard Walter Wolff; Jeanine V. Wolff, all of Grand Haven, Mich.

[22] Filed: June 6, 1975

[21] Appl. No.: 584,465

[52] U.S. Cl. .................................. 360/90; 360/137
[51] Int. Cl.² ...................................... G11B 15/42
[58] Field of Search ............................. 360/90–96, 360/101, 137; 226/127, 176, 181; 242/198, 201, 202

[56] References Cited

UNITED STATES PATENTS

| | | | |
|---|---|---|---|
| 2,936,342 | 5/1960 | Kallmann | 360/101 |
| 3,864,745 | 2/1975 | Platt | 360/96 |

Primary Examiner—Robert S. Tupper
Attorney, Agent, or Firm—Price, Heneveld, Huizenga & Cooper

[57] ABSTRACT

A manually operated tape playback apparatus includes a drive shaft which is manually rotated and means coupling the drive shaft to a self-contained generator for supplying power to an electrical amplifier coupled to a tape pickup head and including a speaker for reproduction of information recorded on the tape. The rotor of the generator is also coupled to a flywheel in turn coupled to a tape capstan for controlling the tape playback speed. The pickup head is mounted to a control arm movable between playback and rewind positions which arm is coupled to forward and reverse spindle drive means and to the drive shaft for controlling the movement of tape between reels and across the pickup head during playback and at an increased speed for rewinding the tape.

19 Claims, 8 Drawing Figures

MANUAL TAPE APPARATUS WITH GENERATOR FOR PROVIDING ELECTRICAL POWER

BACKGROUND OF THE INVENTION

The present invention relates to a manually operated sound reproduction apparatus including an electrical generator for powering an amplifier associated therewith.

In tape playback systems, particularly in small portable apparatus, the manufacturing cost resides primarily in the electrically operated drive mechanism employed for transporting the tape across the playback head. Not only is the tape transport mechanism expensive, it comprises the bulk and weight of the portable tape playback system. In addition, portable equipment which relies upon battery power requires several batteries to supply the relatively high current drain required for operating the transport.

Where cost is a prime consideration or in some locations such as underdeveloped areas where electricity is not generally available or batteries are not available or are very expensive, a mechanically operated tape playback system is needed which is portable and which eliminates the expensive and current consuming electrical transport drive.

In all present tape playback systems, electrical amplifiers are required for the reproduction of recorded information. Even though such amplifiers can, with today's solid state electrical circuit technology, use relatively low current, an electrical power source of some sort is still required for manual tape playback apparatus. Thus, for example, in U.S. Pat. No. 3,864,745 issued Feb. 4, 1975 to Stephen A. Platt, a manual tape playback system is employed and incorporates a transistorized amplifier which is powered by a relatively small battery. Even though such a system represents a significant advancement in the art of portable tape playback mechanism by eliminating the electrical tape transport, the system disclosed still requires the utilization of battery power for the electrical amplifier.

Due to the relatively stringent cost requirements of a portable tape playback system which is competitive with low cost electrically driven systems and yet eliminates the need for separate battery power or another source of electricity, the inclusion of a generator within the transport must be done in a manner to maintain the cost of the unit at a minimum. The utilization of a self-contained generator, of necessity, requires mechanical energy to drive and in operation, produces magnetic fields which must not interfere with the tape pickup head or the tape itself. Thus, significant problems are encountered when designing a manually operated tape playback system including a generator, particularly when the cost factor is considered.

SUMMARY OF THE INVENTION

The apparatus disclosed and described herein satisfies the existing need for an inexpensive manually operated sound reproduction apparatus with electrical amplification of the recorded information by eliminating the use of external or battery power. The apparatus of the present invention includes a manually operated sound reproduction system including an integral manually operated generator which supplied electrical power for an amplifier used with the system.

Apparatus of the preferred embodiment of the present invention includes a manually driven drive shaft for moving a recording medium relative to pickup means and means coupling the shaft to an electrical generator for supplying power to amplifying means for the playback apparatus. Means are coupled to the recording medium and to the generator for controlling the speeds thereof.

When the invention is used in a tape playback system, a tape pickup head is provided and is coupled to the amplifier. In such a system, the drive shaft is coupled to a flywheel for regulating the speed of a tape drive capstan.

According to a further feature of the preferred embodiment of the invention, the pickup head is mounted to an arm movable between playback and rewind positions and cooperates with means for driving a pair of spindles associated with tape reels for advancing or reversing the tape direction during the playback and rewind modes of operation. The arm further cooperates with the drive shaft to selectively disengage the generator and flywheel during rewind.

The various features, advantages and objects of the present invention can be more fully appreciated by reading the following description thereof together with the accompanying drawings in which:

DETAILED DESCRIPTION OF THE PREFERRED EMBODIMENT

Before discussing the detailed construction of the tape playback apparatus, an overview of the principal elements of the apparatus is briefly discussed.

Figure 5:
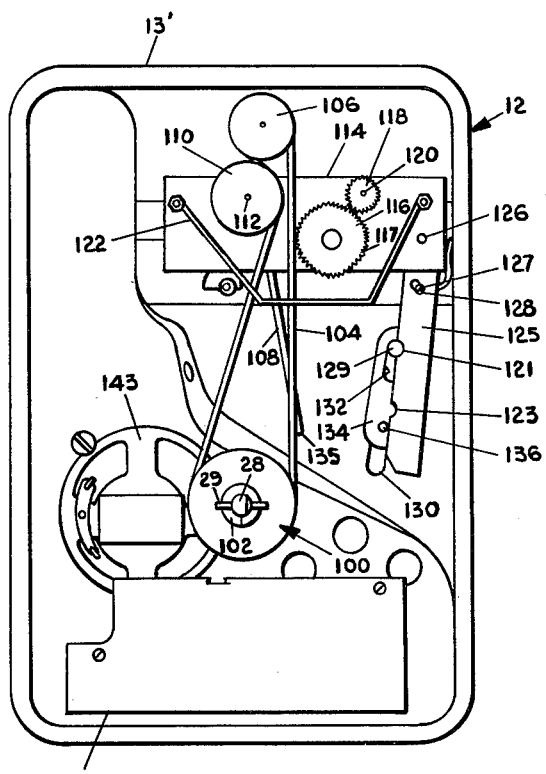
FIG. 5 is a plan view of the underside of the upper portion of the playback apparatus with the apparatus shown in the playback position.
Figure 6:
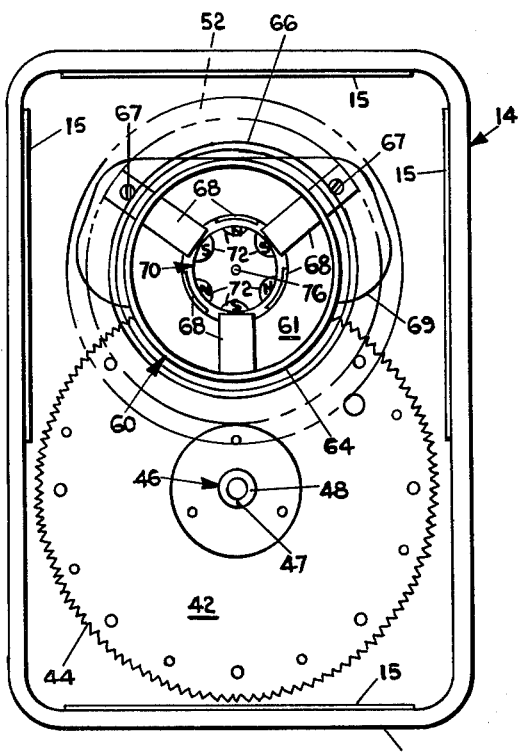
FIG. 6 is a plan view, partly in phantom form, of the bottom portion of the tape playback apparatus as viewed along section lines VI—VI of FIG. 3.

Basically, the tape playback apparatus 10 of the present invention is manufactured utilizing upper and lower cases 12 and 14, respectively, which house the various components and which can be separated as shown in FIGS. 5 and 6. Each of the cases 12 and 14 is molded of a suitable structural polymeric material such as high impact polystyrene. The cases can be blow molded, injection molded or molded by other suitable conventional molding processes. The upper portion of the type playback apparatus is adapted to receive and position a conventional tape cassette 16 (shown in phantom form in FIGS. 1, 2 and 7) on a pair of drive spindles 18 and 20. The spindles engage the reels of the tape cassette and are driven for playback and rewind of the tape. A driven tape capstan 22 assists in transporting the tape across a commercially available pickup head 25 during playback.

The upper section also includes, as will be described in greater detail below, a pivoted control arm 80 on which the tape playback head is mounted and means cooperating with the arm and coupled to a drive shaft 28 of the system for driving spindles 18 and 20 for tape rewind and advancement during playback, respectively, when the apparatus is in use. The upper section of the tape playback apparatus also includes crank means 30 (FIGS. 2 and 7) for manually rotating the drive shaft.

The lower section of the unit includes a speed controlling flywheel 52, a generator 58 employed for generating electrical current which is coupled to a conventional printed circuit amplifier 140, as well as means intercoupling the drive shaft 28 with the generator, flywheel and capstan. Having briefly described the major components of the system, a detailed description of the tape playback apparatus and its operation is now presented.

Figure 7:
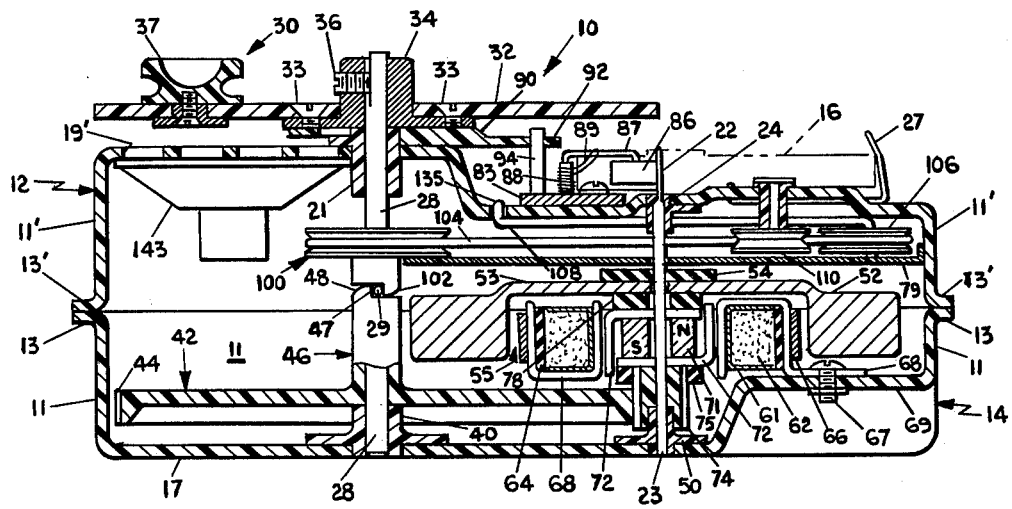
FIG. 7 is a cross-sectional view of the tape playback apparatus taken along section lines VII—VII of FIG. 1.
Figure 8:
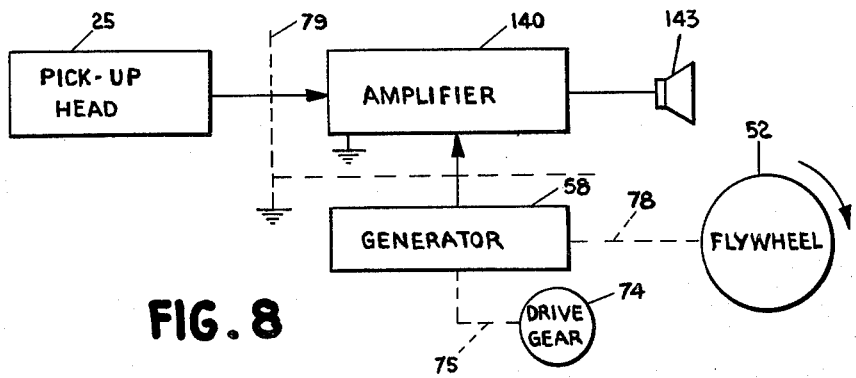
FIG. 8 is an electrical circuit diagram in block form of the electrical components of the tape playback apparatus.

As best seen in FIGS. 6 and 7, the lower case 14 is generally rectangular and includes integral, upwardly turned sides 11 terminating at their upper portions in a horizontally extending, peripheral flange 13 surrounding the case. The upper case likewise is generally rectangular including integral, downwardly depending side walls 11' terminating in a horizontal peripheral flange 13' which mates with flange 13 of the lower case. Extending upwardly from and secured to the inner surfaces of each of the side walls 11 of the lower case are flanges 15 which cooperate with the side walls of the upper case and are threaded such that the upper and lower cases can be secured to each other by means of screws 15' (FIG. 3) when the unit is assembled.

A bushing 40 (FIG. 7) is mounted to the floor 17 of the lower case 14 for rotatably supporting the lower end of the drive shaft 28 and permitting movement of the shaft along its axis. Resting on top of bushing 40 and surrounding the drive shaft is a main drive gear 42 having a relatively large diameter body with peripheral gear teeth 44 and a central upstanding collar 46 terminating in a spiral, tapered ratchet surface 48 defining a shoulder 47. Surface 48 and shoulder 47 cooperate with a transverse pin 29 (FIGS. 5, 7) extending through drive shaft 28 such that the drive gear 42 is rotated by drive shaft 28 as pin 29 engages the upstanding shoulder 47 which occurs only when drive shaft 28 is rotated in a clockwise direction as viewed in FIGS. 1 and 2. This direction corresponds to the type playback mode of operation. Both the collar 46 and bushing 40 have an internal diameter slightly greater than that of drive shaft 28 permitting the free rotation of the drive shaft therein with the only drive coupling between shaft 28 and the main drive gear 42 being by means of pin 29 and shoulder 47. If shaft 28 is rotated in a counterclockwise direction, the pin will ride over the inclined ratchet surface 48 without rotating the main drive gear 42.

Mounted also to the floor 17 of lower case 14 is a second bushing 50 which supports a lower enlarged shaft 23 of capstan 22. The enlarged shaft portion 23 of the capstan is resiliently coupled to a flywheel 52 by means of a disc 54 (FIG. 7) of stiffly resilient material such as rubber which is cemented to the upper surface 53 of the flywheel and which includes a central aperture therein which tightly secures the disc 54 to the cylindrical shaft of the capstan. This resilient coupling cushions the capstan against any relatively high frequency speed variations which may be superimposed on the flywheel thus providing a uniform drive speed for the tape across the pickup head.

The flywheel 52 is generally circular and has a diameter of approximately 5 to 6 inches and a weight preferably of 1 to 3 pounds. It has been found that a flywheel with these physical dimensions and weight provides sufficient speed regulation and control for the manual tape playback apparatus. Flywheel 52 includes a lower recess 55 (FIG. 7) providing clearance for the electrical generator 58 which generator further serves to couple the main drive gear 42 to the flywheel as described below.

The generator comprises a circular field coil 60 including a spool 61 of nonmagnetic material such as plastic around which there is wrapped in a circular fashion a plurality of turns of wire 62 to define the field coil. The opposite ends of the field coil wire provide the pulsed output voltage which is rectified, filtered and utilized as the direct source for the amplifier as described below. In the preferred embodiment, 900 turns of 27 gauge copper wire were employed for the field coil of the generator.

Surrounding the outer periphery of the spool 61 and the enclosed coil is a first flat ring 64 (FIGS. 6 and 7) of steel in turn surrounded in spaced relationship by a second flat ring 66 also of steel. Sandwiched between rings 64 and 66 are a plurality of generally U-shaped bands 68 of steel which, as best seen in FIG. 6, are spaced at 60° intervals and serve to concentrate the magnetic field applied to the field coil by the generator's rotor 70. Two of the U-shaped bands 68 are employed for securing the field coil in a stationary relationship with respect to the lower case 14 by means of screws 67 which extend through members 68 and are secured to a raised, generally semicircular mounting boss 69 integrally formed in the lower case 14. Boss 69 assures that the field coil is positioned just under the flywheel 52 within recess 55 and coaxially with respect to the flywheel. The center area of the field coil thus defines a circular opening concentric with the capstan shaft 23 and into which is mounted the generator rotor 70.

As best seen in FIG. 7, the rotor 70 comprises a generally cylindrical permanent magnet 71 having an upper north pole and a lower south pole and six generally L-shaped pole pieces 72 alternately positioned on the north and south poles, respectively, and spaced at 60° intervals to define a six-pole permanent magnet rotor structure of alternate poles as also seen in FIG. 6. Coupled to the lower portion of pole pieces 72 is a drive gear 74 (FIG. 7) having peripheral teeth which engage teeth 44 on the main drive gear 42. The resilient intercoupling between gear 74 and the lower portion of the rotor 70 is achieved by means of an annular, stiffly resilient washer 75 which snugly surrounds the drive gear 74 and can be cemented to the periphery thereof with a rubber cement if desired. Washer 75 in turn is cemented to the lower portion of the rotor including the horizontal legs of the lower pole pieces 72.

Thus, when the drive shaft 28 is rotated by the crank mechanism 30, gear 42 will drive gear 74 in turn rotating rotor 70 which surrounds the capstan. Gear 74 includes an enlarged cylindrical recess which fits over an upstanding cylindrical shoulder of bushing 50 for rotation therearound. The rotor 70 includes a central aperture 76 (FIG. 6) formed in the magnet 71 and each of the pole pieces 72 of larger diameter than that of the capstan of capstan shaft 23. Thus, the rotor 70 is effectively isolated from the capstan shaft to prevent pulses of resistive force developed by the generator under load conditions from being transmitted to the capstan. The rotor is thus directly driven by means of the intercoupled gears 42 and 74.

The rotor is coupled to flywheel 52 by a resilient interconnection coupling an upper resilient annular washer 78 (FIG. 7) which is cemented to the top portion of the rotor and which is compressibly fitted between the lower surface of the flywheel within recess 55 thereof and the upper surface of the rotor. Washers 74 and 78, as in the case of the resilient coupling member 54, comprise a suitable resilient material such as rubber. The rotor is thus secured in concentric and spaced relationship to the field coil 60 by means of the bushing 50 and gear 74 and by virtue of the interconnection at its upper end, with the flywheel. It is seen that the rotor is effectively isolated from the capstan and its speed is regulated by the flywheel 52 by means of the resilient connection between the rotor and the flywheel. The flywheel in turn drives the capstan 22 by means of the resilient coupling 54. The only moving parts which extend between the upper and lower casings are the drive shaft 28 and the capstan shaft 23.

Capstan 22 as well as drive gears 74 and 42 and flywheel 52 are made of a nonmagnetic material such as aluminum, plastic or the like so as not to interfere with the operation of the generator or in the case of the capstan, to prevent erasure of the magnetic tape coming in contact with the capstan. In the preferred embodiment, the capstan was made of stainless steel while the flywheel was made of aluminum or zinc. In order to further isolate the generator 58 from the pickup head and the amplifier positioned in the upper casing 12, a shield 79 comprising a plate of ferromagnetic material such as steel is positioned in spaced relationship above the flywheel 52 and includes a central aperture through which the capstan extends without interference. Plate 79 can be secured to either the upper or lower housing for convenience and in the preferred embodiment, is secured to one of the walls 11' of the upper housing as best seen in FIG. 7. Shield 79 is electrically grounded to the amplifier ground in order to assume its effectiveness in shielding the pickup head and amplifier from any stray fields generated by the generator 58.

Having described the construction of the drive mechanism for the capstan as well as the generator construction and its drive, a description of the spindle drive mechanism and the remaining structure of the tape apparatus is now presented in conjunction with FIGS. 1–5.

Figures 1, 2:
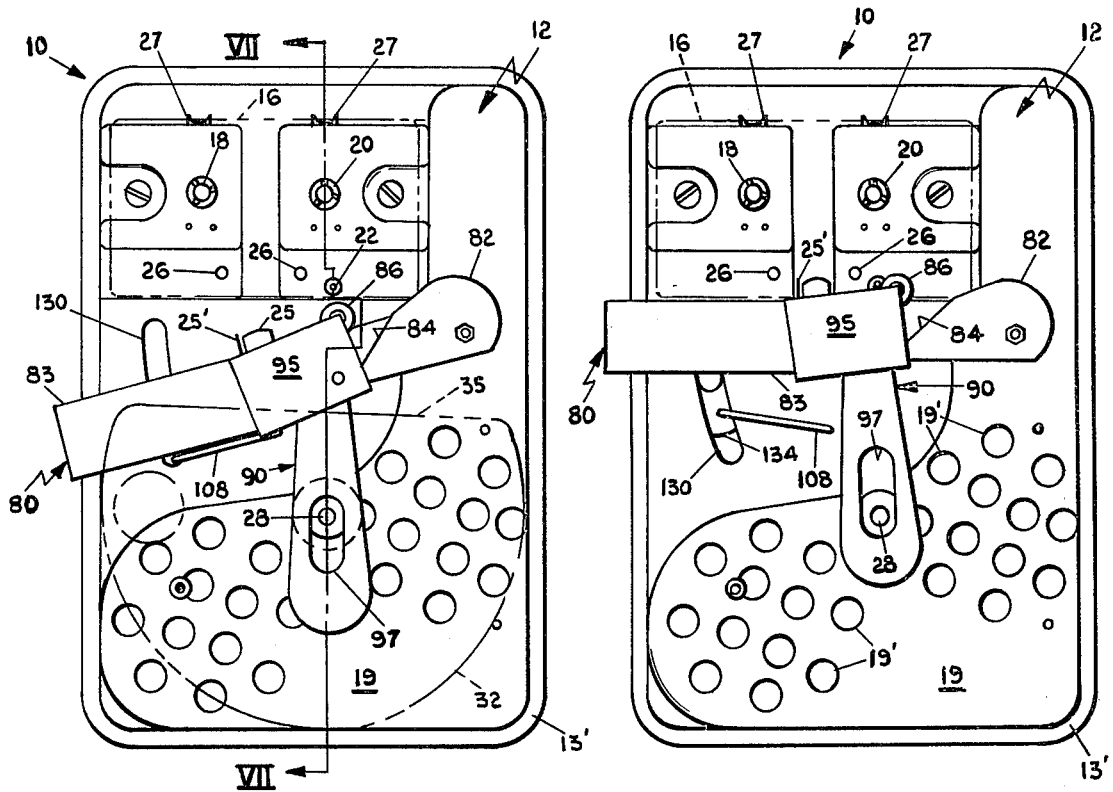
FIG. 1 is a top plan view of the tape playback apparatus embodying the present invention and shown partly in phantom form and in the rewind position.
FIG. 2 is a top plan view of the tape playback apparatus, partly in phantom form and shown in the playback position.

Mounted on a raised, generally L-shaped plateau 19 integrally formed in the surface of upper case 12 is a bushing 21 (FIG. 7) which rotatably supports the upper end of drive shaft 28. The upper case 12 also includes a bushing 24 surrounding and supporting the upper portion of capstan shaft 23 as best seen in FIG. 7. The crank 30 comprises a generally circular disc 32 of plastic or other suitable material which is mounted to a hub 34 in turn secured to a flattened surface of drive shaft 28 by means of a set screw 36. Disc 32 is secured to hub 34 by means of screws 33 (FIG. 7). Disc 32 is cut off, as best seen in FIG. 1, along an edge 35 to permit alignment of edge 35, as seen in FIG. 1, permitting easy access for insertion and removal of the tape cassette 16. The crank assembly 30 includes a knob 37 rotatably mounted to the outer edge of disc 32 for rotating the drive shaft 28 through the crank. A disc 32 is utilized in place of a simple crank arm, which would serve the same mechanical function, for the purpose of shielding and thereby protecting a portion of the spindle drive mechanism under the disc. Before describing the spindle drive mechanism for rewind and playback modes of operation, a brief description of the positioning and alignment structure for the cassette-type tape for which the preferred embodiment is specifically adapted together with the tape pickup head and associated mechanism is now presented.

Figure 3:
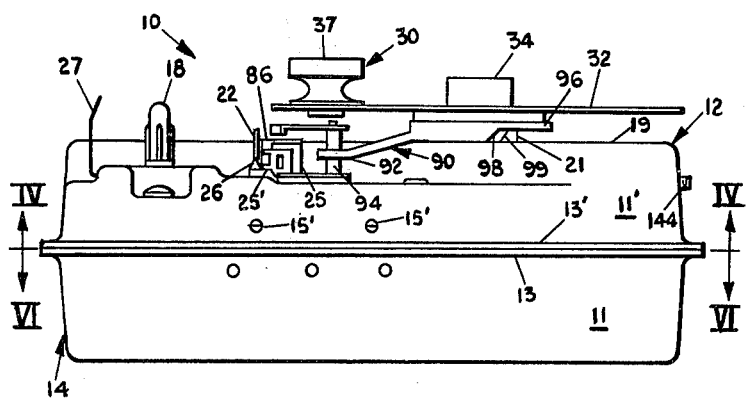
FIG. 3 is a left side elevational view of the tape playback apparatus shown in FIGS. 1 and 2.

The upper casing 12 includes, as best seen in FIGS. 1–3, a pair of spaced tapered alignment pins 26 extending upwardly therefrom and positioned to extend through corresponding apertures in a standard tape cassette. In order to assure the cassette is securely snapped into position with the spindles 18 and 20 extending through the reels of the cassette and the tape therein in engagement with the pickup head, a pair of wire biasing springs 27 are positioned to engage the rear edge of a cassette 16 and bias the cassette in the direction of the playback head 25. Springs 27 are suitably secured to the upper casing 12 and as best seen in FIG. 7, include legs which extend through the casing below the top surface thereof and ends which project upwardly through apertures near the spindles which then are cemented into position. Other mounting means could likewise be conventiently provided. With this structure, therefore, the cassette can be positioned on or removed from the tape apparatus in a predetermined, aligned position when control arm 80 is in the position shown in FIG. 1.

The control arm 80 provides a movable mounting base for the pickup head 25 which is secured thereto by a conventional mounting bracket which may include a cushioning pad between the pickup head and the control arm itself. The commercially available pickup head 25 includes an integral, generally U-shaped tape guide 25' which is positioned forwardly of the tape head and as best seen in FIG. 3, assumes that the magnetic tape from the cassette is in exact alignment with the gap in the pickup head.

Also mounted to control arm 80 for movement therewith is a pinch roller assembly consisting of a resilient pinch roller 86 rotatably mounted to a downwardly depending leg of a U-shaped axle 87 (FIG. 7) having its opposite leg pivotally mounted to a post 88 suitably secured to arm 80. A bias spring 89 surrounds post 88 and engages axle 87 to resiliently bias the pinch roller 86 into engagement with capstan 22 with the magnetic tape extending between th capstan and the pinch roller 86 when the control arm is moved to the playback position shown in FIG. 2.

The control arm 80 is pivotally mounted at end 82 to the raised plateau 19 of the upper case 12 to position the playback head in an opening provided therefor in the standard cassette 16 and the tape and the pinch roller in engagement with the capstan with the tape therebetween as shown in FIG. 2. In order to vertically position the tape head and pinch roller, the control arm 80 includes a vertical wall 84 providing the desired vertical spacing between pivot end 82 and the remaining lower end 83 to which the tape head and pinch roller assembly are mounted.

Coupled to the control arm 80 for disengaging the flywheel, capstan and generator drive during the rewind mode of operation is a camming lever 90 (FIGS. 1-3) which is pivotally mounted at one end 92 to a post 94 extending upwardly from end 83 of control arm 80. Post 94 also supports a protective cover plate 95 which protects the playback head and pinch roller mechanism. The cam lever 90, as best seen in FIG. 3, extends away from and upwardly from post 94 to an end 96 which includes an elongated slot 97 (FIGS. 1 and 2) extending vertically therethrough and surrounding drive shaft 28 and bushing 21 (FIG. 7). End 96 includes at its lower surface a tapered camming surface 98 on opposite sides of slot 97 which engages a similarly tapered, fixed surface 99 which defines a camming surface and can be integrally formed as part of bushing 21 extending through the upper case. When control arm 80 is moved rearwardly in the position shown in FIG. 1, tapered surfaces 98 and 99 interengage, forcing end 96 of camming lever 90 upwardly thereby lifting drive shaft 28 upwardly a sufficient amount such that transverse pin 29 (FIG. 7) is raised from the ratchet surface 48 of bushing 46. This disengages the drive shaft from the main drive gear 42 to disconnect the generator and flywheel from the crank arm 30. Pin 29, however, continues to engage a similar shaped ratchet surface 102 on a drive pulley 100 associated with the spindle drive mechanism now described.

A spindle drive belt 104 surrounds pulley 100 and an idler pulley 106 mounted to one end of a pivot arm 108. Arm 108 is positioned when the apparatus is in the playback mode of operation, as seen in FIG. 5, with belt 104 engaging a first spindle drive pulley 110. Pulley 110 is mounted on an axle 112 extending through a spacer plate 114 and the case and is coupled to spindle 20 for rotating spindle 20 by the rotation of crank 30 for advancing the tape through the cartridge while the capstan maintains the tape speed across the playback head relatively constant. Spacer plate 114 is mounted in spaced relationship to the upper case 12 by suitable mounting bosses permitting arm 108 to extend thereunder.

Pivot arm 108 can be shifted to the rewind position shown in FIG. 4 by the control arm 80 as described below such that belt 104 engages a grooved recess in a second spindle drive pulley 116 which also includes a plurality of gear teeth 117. The gear thus defined by pulley 116 engages a smaller diameter gear 118 mounted on a shaft 120. Shaft 120 extends through plate 114 and the case and spindle 18 is directly coupled to shaft 120 to be driven by the rotation of gear 118 in an opposite direction to spindle 20 for rewind of the tape. The gear ratio between gears 116 and 118 is approximately 2:1 to provide a fast rewind for the tape cassette. A guard bar 122 is attached to the spacer plate 114 and extends under and across the drive belt 104 to prevent the belt from slipping from the drive and idler pulleys as the pivot arm 108 is moved between the rewind and playback positions.

In order to control the pivot arm 108 and provide positive stops for the mechanism in the rewind and playback positions, a spring-loaded stop arm 125 is provided. Arm 125 is pivotally mounted to the spacer plate 114 by means of pivot pin 126. Spring means 127 extend between the side wall of the upper case and an aperture 128 in arm 125 for biasing the arm against a pin 129 extending downwardly from control arm portion 83 through a slot 130 formed in the upper case 12. Arm 125 includes a first detent 121 for engaging pin 129 and securing the control arm 80 in the playback position shown in FIGS. 2 and 5 and a second detent 123 for securing the control arm in the rewind position shown in FIGS. 1 and 4.

Pin 129 also extends through a slot 132 formed in a slide 134 which includes an aperture for receiving a downwardly depending end 136 of pivot arm 108 which also extends across a segment of the case, as seen in FIGS. 1 and 2, and then downwardly through aperture 135 (FIG. 7) in case 12. Movement of control arm 80 and pin 129 coupled thereto thus causes arm 108 to pivot about aperture 135 between the playback and rewind positions shown in FIGS. 4 and 5 respectively. Slots 132 and 130 permit the required different arcuate motions of arm 80 and arm 108 between these positions.

Thus, control arm 80 not only selectively positions the tape playback head and counter pressure roller in operative engagement with the tape of the cassette, it further selectively disengages the flywheel drive during rewind modes of operation while also controlling the drive mechanism for the spindles between playback and rewind positions.

Figure 4:
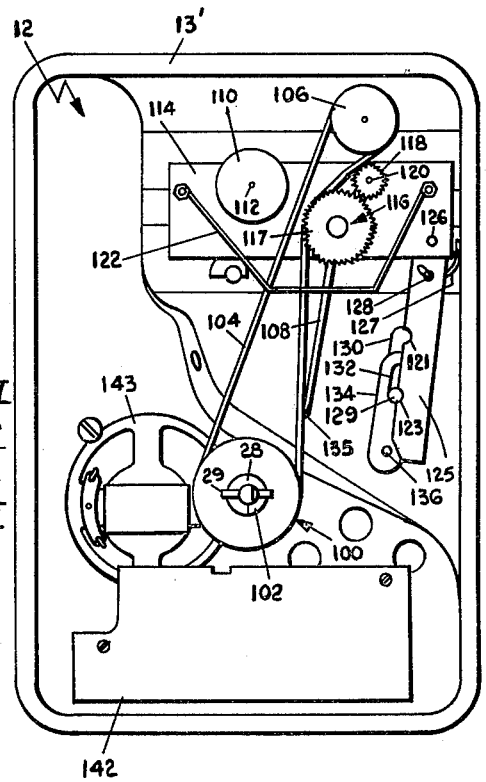
FIG. 4 is a plan view of the underside of the upper portion of the playback apparatus as viewed along the section lines IV—IV of FIG. 3 with the apparatus shown in the wind position.

Mounted on the underside of the raised plateau portion 19 of the upper case 12 is a commercially available transistorized amplifier 140 which, as seen in FIGS. 4 and 5, consists of a circuit board 142 with the various components of the amplifier mounted thereto. Amplifier 140 includes suitable filter means such as a pi or other conventional power supply filter for converting the pulsed voltage from generator 58 into approximately 9V D.C. for supplying operating power for the amplifier. Amplifier 140 has an input terminal coupled to the pickup head 25 and an output coupled to a speaker 143 mounted to the upper case for reproducing the information on the prerecorded tape. A plurality of apertures 19' are provided in the case to provide a sound transmission path from speaker 143. The amplifier includes a volume control including a knob 144 extending from the one wall of the upper case (FIG. 3) for adjusting the volume of the amplifier which is actuated only when the generator is actuated which occurs only during playback modes of operation. Having described the construction of the mechanical tape playback unit of the preferred embodiment of the present invention, a brief description of its operation is now presented.

OPERATION

In operation, the control arm 80 is moved into a position shown in FIG. 1 and a tape cassette 16 is snapped into place by first inserting the trailing edge against spring members 27 and then dropping the leading edge over guide pins 26, spindles 18 and 20, and capstan 22. The control arm 80 is then shifted to a forward position, shown in FIG. 2, which engages the drive shaft with the main drive gear 42. As the crank mechanism 30 is rotated in a clockwise direction, as seen from the top, the spindle 20 is rotated by the spindle drive mechanism in a position shown in FIG. 5 while simultaneously the capstan 22 is rotated by means of the interconnection of the generator rotor 70 to the flywheel and in turn the resilient coupling of flywheel 52 to the capstan shaft 23. At the same time, the generator provides the electrical power for the amplifier 140. As the tape is transported across playback head 25, the information recorded thereon is reproduced through speaker 143. The speed of the device is maintained at the desired operational speed which can be ascertained by the fidelity of the recorded information being reproduced easily by the operator with the aid of the flywheel.

In order to rewind the tape at a relatively rapid speed as compared to the playback speed, control arm 80 is moved from the playback position shown in FIG. 2 to the rewind position shown in FIG. 1 shifting the spindle drive mechanism to the position shown in FIG. 4. Also, the camming means including arm 90 and camming surface 99 (FIG. 3) raise the drive shaft to disengage the main drive gear 42 and thus, the generator, flywheel and capstan.

During rewind, as the crank arm is moved in a clockwise direction, the drive belt 104 engages the rewind drive pulley 117 and gear 118 to rotate drive spindle 18 and in a clockwise direction thus rewinding the cassette. The rapid rewind permits the user to retrace the tape when, for example, the tape is used for lesson material and permits repeated listening of the recorded information. Naturally, if the other side of the cassette is desired to be heard, the tape is not rewound but the cassette is simply removed and inverted and the playback mode of operation again instituted.

In both modes of operation (i.e., playback and rewind), the ratchet mechanism associated with the drive shaft inhibits the operation of the mechanism when the crank arm is turned in the wrong direction (i.e., counterclockwise). By providing the unique integral generator means, the device of the present invention can be employed in locations where electrical power and batteries are generally unavailable. The device thus is particularly useful for educational purposes in remote areas of the world. The unique drive means permits continued use of the device with little operator effort while providing excellent fidelity amplified reproduction of the recorded information.

It will become apparent to those skilled in the art that various modifications to and applications of the present invention can be made. Thus, for example, the integral generator could be employed with manual sound reproduction apparatus other than the tape system of the preferred embodiment. Also, some modification of the drive means for the generator and recording media can be made. It is understood also that the tape system of the preferred embodiment can be employed for recording as well as playback. In such case, the generator supplies the required operating power for the conventional electrical circuits used for recording. These and other such applications and modifications of the preferred embodiment can be made, however, without departing from the spirit or scope of the present invention as defined by the appended claims.

The embodiments of the invention in which an exclusive property or privilege is claimed are defined as follows:

1. A sound reproduction apparatus for manual operation comprising:
    pickup means for detecting prerecorded information on a recording medium;
    manually driven drive means including a driven member for providing relative motion between a recording medium and said pickup means;
    generator means coupled to said drive means for generating electrical power when said drive means is manually operated whereby said apparatus provides electrical power when in use which can be employed operating power for an electrical amplifier; and
    resilient coupling means extending between said driven member and said drive means to isolate from said driven member drive speed variations caused by said generating means when generating electrical power.

2. The apparatus as defined in claim 1 and further including a sound reproducing device and an electrical amplifier coupled between said pickup means and said sound reproducing device for electrically amplifying signals detected by said pickup means and providing an accoustical output thereof.

3. The apparatus as defined in claim 2 adapted to reproduce prerecorded information on a tape and wherein said drive means includes: a tape capstan and means positioning a tape in pressure relationship to said capstan, said capstan including a drive shaft and crank means coupled to a drive shaft for manual rotation of said drive shaft, first means coupling said drive shaft to said generator and second means coupling said drive shaft to said tape capstan.

4. A sound reproduction apparatus for manual operation comprising:
    pickup means for detecting prerecorded information on a recording medium;
    manually driven drive means for providing relative motion between a recording medium and said pickup means;
    a sound reproducing device and an electrical amplifier coupled between said pickup means and said sound reproducing device for electrically amplifying signals detected by said pickup means and providing an accoustical output thereof;
    generator means coupled to said drive means for generating electrical power when said drive means is manually operated and to said electrical amplifier to provide operating power for said electrical amplifier; and
    wherein said drive means comprising a tape capstan and means positioning a tape in pressure relationship to said capstan, said capstan including a drive shaft and crank means coupled to said drive shaft for manual rotation of said drive shaft, first means coupling said drive shaft to said generator and second means coupling said drive shaft to said tape capstan wherein said first coupling means includes clutch means coupled to said drive shaft and first gear means coupling said clutch means to said generator.

5. The apparatus as defined in claim 4 wherein said second coupling means comprises speed regulating means coupled to said generator to be driven thereby and resilient means coupling said speed regulating means to said capstan shaft.

6. The apparatus as defined in claim 5 wherein said speed regulating means comprises a flywheel.

7. The apparatus as defined in claim 6 adapted to transport tape across said pickup means and between reels and wherein said drive means further includes a pair of spaced spindles for receiving said reels and means for selectively coupling said spindles to said drive shaft for rotation to advance and rewind tape between said reels.

8. The apparatus as defined in claim 7 wherein one of said spindles includes gear means engaged by said selective coupling means for fast rewind of said tape onto a reel positioned on said one spindle.

9. The apparatus as defined in claim 8 wherein said generator means comprises a stationary field coil and a permanent magnet rotor rotatably positioned in said field coil, said rotor coupled to said first gear means for rotation as said drive shaft is manually rotated.

10. A manually operated tape playback apparatus comprising:

support means for supporting the operative components of the tape playback apparatus, a control arm and means for mounting said control arm on said support means for movement between playback and rewind positions;

tape carrier means mounted on said support means including a pair of spaced drive spindles and a capstan;

a tape pickup head coupled to said control arm for movement between tape engaging and nonengaging positions when said control arm is in the playback and rewind positions respectively;

manually driven drive means positioned on said support means and coupled to said control arm and to said spindles and resiliently coupled to said capstan for tape playback and rewind modes of operation;

generator means coupled to said drive means for generating electrical power when said drive means is manually operated whereby said apparatus provides electrical power when in use which can be employed to provide operating power for an electrical amplifier; and flywheel means and additional resilient coupling means coupling said flywheel to said generating means and wherein said flywheel is further resiliently coupled to said capstan.

11. A manually operated tape playback apparatus comprising:

support means including a pair of spaced spindles for receiving a pair of reels and a tape capstan;

a pickup head for detecting information on a tape transported between reels on said spindles;

manually driven drive means coupled to said support means, to said capstan and selectively coupled to one of said spindles for transporting tape between reels on said spindles wherein said drive means includes a crank coupled to a drive shaft and unidirectional drive means coupling said drive shaft to said capstan and to said spindles whereby tape can be transported between said reels only when said drive shaft is rotated in a first direction.

12. The apparatus as defined in claim 11 and further including cam means coupled to said drive shaft and movable between playback and rewind positions to disengage said drive shaft from said capstan when in said rewind position.

13. The apparatus as defined in claim 12 and further including gear means coupled between one of said spindles and said drive shaft for increasing the rewind speed of tape between reels mounted on said spindles.

14. The apparatus as defined in claim 13 and further including generator means coupled to said drive shaft for generating electrical power when said drive shaft is rotated to actuate said capstan whereby said apparatus provides electrical power when in use which can be employed to provide operating power for an electrical amplifier.

15. The apparatus as defined in claim 14 and further including a sound reproducing device and an electrical amplifier coupled between said pickup means and said sound reproducing device for electrically amplifying signals detected by said pickup means and providing an accoustical output thereof.

16. A manually operated tape playback system comprising:

support means including a pair of rotatable spindles for receiving tape containing reels;

pickup means for detecting information on a tape transported between reels on said spindles;

a capstan rotatably mounted to said support means;

a manually driven drive shaft;

a generator including a rotor concentrically positioned over said capstan and including first means coupling said rotor to said drive shaft for the generation of electrical power when said drive shaft is rotated;

a flywheel concentrically mounted to said capstan, resilient coupling means coupling said flywheel to said capstan;

second means coupling said flywheel to said rotor to be driven by said rotor; and drive means selectively coupling said drive shaft to one of said spindles to transport tape between reels positioned on said spindles.

17. The system as defined in claim 16 and further including a control arm and means for movably mounting said control arm on said support means for movement between playback and rewind positions and wherein drive means is coupled to said control arm for actuation of a first spindle when said control arm is in a playback position and a second spindle when said control arm is in said rewind position.

18. The system as defined in claim 17 wherein said first coupling means comprises a disengageable unidirectional drive coupling gear means to said drive shaft and to said rotor and further including cam means coupled between said control arm and said drive shaft to disengage said drive rotor from said drive shaft when said cam means is in said rewind position.

19. The system as defined in claim 18 and further including means for releasably holding said control arm in one of said playback or rewind positions.

* * * * *

UNITED STATES PATENT AND TRADEMARK OFFICE
CERTIFICATE OF CORRECTION

PATENT NO. : 4,001,887
DATED : January 4, 1977
INVENTOR(S) : Stephen A. Platt et al.

It is certified that error appears in the above-identified patent and that said Letters Patent are hereby corrected as shown below:

Column 1, line 7:
  After "apparatus" insert -- integrally --.

Column 2, line 40:
  "wind" should be -- rewind --.

Column 2, line 68:
  "type" should be -- tape --.

Column 4, line 26:
  After "direct" insert -- current --.

Column 6, line 46:
  "assumes" should be -- assures --.

Column 6, line 57:
  "th" should be -- the --.

Signed and Sealed this

Twenty-fourth Day of May 1977

[SEAL]

Attest:

RUTH C. MASON
Attesting Officer

C. MARSHALL DANN
Commissioner of Patents and Trademarks